United States Patent [19]

Shemwell

[11] 4,331,689

[45] May 25, 1982

[54] ALCOHOL-STABLE, LOW PH-STABLE FAT EMULSION PRODUCT

[75] Inventor: Gale A. Shemwell, Van Nuys, Calif.

[73] Assignee: Carnation Company, Los Angeles, Calif.

[21] Appl. No.: 221,092

[22] Filed: Dec. 29, 1980

[51] Int. Cl.³ .......................... C12G 3/06; A23L 1/19; A23C 11/00

[52] U.S. Cl. .................................... 426/98; 426/103; 426/592

[58] Field of Search ................ 426/98, 103, 569, 571, 426/578, 592

[56] References Cited

U.S. PATENT DOCUMENTS

| | | | |
|---|---|---|---|
| 3,098,748 | 7/1963 | Noznick et al. | 426/98 |
| 3,159,585 | 12/1964 | Evans et al. | 426/103 X |
| 3,764,346 | 10/1973 | Noznick et al. | 426/98 X |
| 4,045,589 | 8/1977 | Petrowski et al. | 426/98 X |
| 4,146,652 | 3/1979 | Kahn et al. | 426/570 X |
| 4,242,364 | 12/1980 | Buddemeyer et al. | 426/98 |

*Primary Examiner*—Robert A. Yoncoskie

[57] ABSTRACT

This invention provides a dried fat emulsion concentrate which contains a major proportion by weight of a water soluble carbohydrate, and an edible fat or oil, with the fat or oil particles being encapsulated with a lipophilic starch derivative. The dried emulsion concentrate when reconstituted with water forms an oil-in-water emulsion which is stable in the presence of a relatively high alcohol concentration and relatively high acidity, over a wide range of temperatures, including pasteurizing and freezing temperatures. The reconstituted emulsion is combined with wine having an alcohol concentration of 8%–20% (vol/wt) and a pH of about 2.5 to 5.0 to form a stable oil-in-water emulsion in the wine, thereby providing a unique wine based beverage having a creamy appearance and mouthfeel.

10 Claims, No Drawings

ALCOHOL-STABLE, LOW PH-STABLE FAT EMULSION PRODUCT

BACKGROUND OF THE INVENTION
1. Field of the Invention

This invention relates to a dried protein-free, fat emulsion concentrate, which when reconstituted with an aqueous media, forms an oil-in-water emulsion which is stable in the presence of alcohol and an acidic pH. More particularly, the invention relates to the method of using a dried, protein-free, fat emulsion concentrate to impart a creamy appearance and creamy mouthfeel to an aqueous product containing alcohol and having an acidic pH.

2. Description of the Prior Art

In recent years, dried non-dairy fat emulsion products have become of increasing importance in the food industry because of their ability to impart a creamy appearance and a creamy mouthfeel to aqueous products, such as the use of non-dairy coffee whiteners to whiten and improve the taste of coffee. Typically such dried fat emulsion products contain as essential ingredients vegetable fat, carbohydrate (such as corn syrup solids, sucrose, etc.), protein, emulsifiers, stabilizers, and stabilizing and buffering salts. Upon addition to an aqueous medium, the dried fat emulsion product forms an oil-in-water emulsion which imparts a creamy appearance to the medium due to the refraction of light from the finely emulsified fat globules. A water dispersible protein, such as sodium caseinate or soy protein is included as an essential ingredient in the emulsion product to stabilize the liquid emulsion concentrate through drying so that when the dried emulsion is reconstituted, such as by addition to coffee, a stable emulsion is provided.

U.S. Pat. No. 4,045,589 discloses a dried non-dairy fat emulsion product for use as a coffee whitener which is prepared without the use of protein. The non-dairy coffee whitener of that patent comprises vegetable fat, carbohydrate, emulsifier, and buffering salts, with emulsion stability upon reconstitution being provided by the use of a chemically modified dextrinized starch having a lipophilic character.

The principal use heretofore of dried non-dairy fat emulsion products has been as a coffee whitener. Other well known uses for these products has been in the preparation of imitation sour cream mixes, dip mixes, creamy salad dressings, and whipped toppings. More recently, dried protein-containing fat emulsion products have also been used in the production of an alcoholic beverage containing neutral grain spirits to impart a creamy appearance to the beverage. However, prior to the present invention, attempts to produce a flavored wine based beverage having a creamy appearance and mouthfeel using such dried protein-containing fat emulsion products have not been successful since the dried fat emulsion products available heretofore have not been stable against the alcohol concentration, acidity and/or the destabilizing compounds such as tannins which are present in wine. These characteristics of wine make it difficult to maintain a stable oil-in-water emulsion when the fat emulsion product is reconstituted and added to wine.

SUMMARY OF THE INVENTION

The present invention provides a dried, protein-free, fat emulsion concentrate which, when reconstituted with water, forms an oil-in-water emulsion which is stable in the presence of a relatively high alcohol concentration and a relatively high acidity, and which remains stable over a wide range of temperatures, including pasteurizing and freezing temperatures. The dried emulsion concentrate contains a major proportion by weight of a water soluble carbohydrate, such as corn syrup solids, and an edible fat or oil, with the fat or oil particles being encapsulated with a lipophilic starch derivative. One or more stabilizers may be included with the dried emulsion concentrate, in minor amounts, as an optional ingredient.

The dried emulsion concentrate is prepared by forming a liquid emulsion concentrate containing the water soluble carbohydrate, edible fat or oil, edible lipophilic starch derivative and sufficient water to maintain the solids in solution or dispersion and provide sufficient fluidity to the concentrate so that it may be pumped. The amount of lipophilic starch derivative included in the emulsion concentrate is sufficient to encapsulate substantially all of the fat or oil globules in the concentrate to thereby stabilize the emulsion through the drying step. The liquid emulsion concentrate is then homogenized and spray dried.

The dried emulsion concentrate thus produced is particularly well suited for producing a stable oil-in-water emulsion in an aqueous medium having a relatively high alcohol concentration and relatively high acidity, such as wine. The dried emulsion concentrate is combined with water to form an oil-in-water emulsion containing 15% to 30% by wt. of the dried emulsion concentrate, and this emulsion is added to wine having an alcohol concentration of 8%–20% (vol/wt) and a pH of about 2.5 to 5.0 to form a stable oil-in-water emulsion in the wine, thereby producing a unique wine base beverage having a creamy appearance and mouthfeel. The amount of the reconstituted emulsion added to the wine in order to produce a beverage having these unique, desired characteristics is sufficient to provide a ratio of wine to dried emulsion concentrate of about 5:1 to 15:1. The resulting oil-in-water emulsion in wine is shelf stable and is resistant to grain or sludge formation and phase separation over extended periods of time.

DETAILED DESCRIPTION OF THE INVENTION

In preparing the dried, protein-free, fat emulsion concentrate of this invention, a liquid emulsion concentrate containing an edible fat or oil, water-soluble carbohydrate, and a lipophilic starch derivative is prepared by adding the ingredients to hot water, and then drying the emulsion concentrate. The edible fat or oil may be of animal or vegetable source, but should be light in color, have a bland or neutral flavor, and be resistant to oxidative rancidity. Fats and oils which may be used include partially or fully hydrogenated vegetable fats and oils such as coconut oil, palm kernel oil, cottonseed oil, corn oil, soybean oil, peanut oil, and the like, and mixtures thereof, tallow and lard. Satisfactory results have been obtained in producing the dried emulsion concentrate of this invention using hydrogenated vegetable oils having a melting point of about 118° F., as well as hydrogenated vegetable oils having a melting point of about 65° F. The fat or oil may comprise from about 15% to 25% by weight of the dried emulsion product, with levels of between about 18% to 22% by weight of the dried concentrate being preferred.

A water soluble carbohydrate, such as corn syrup solids, sucrose, lactose, and the like, is included in the dried emulsion concentrate to act as a carrier for the fat and to provide flavor. The carbohydrate comprises a major proportion of the dried emulsion product, and is present in an amount of from about 57% to 65% by weight of the dried product.

As noted hereinabove, the dried, protein-free emulsion concentrate of this invention is prepared by forming a liquid emulsion concentrate which is dried, such as by spray drying. In order to stabilize the emulsion through the drying step, a cooked or prejelled lipophilic starch derivative, that is, a starch derivative having fat-compatible properties, is included in the liquid emulsion concentrate, so that when the dried emulsion concentrate is reconstituted, a stable emulsion is formed. Due to the use of the lipophilic starch, the oil-in-water emulsion formed by reconstitution of the dried emulsion is stable even in the presence of an acidic pH, a relatively high concentration of alcohol, and compounds such as tannins which would destabilize conventional dried, protein-containing emulsion products. It is believed that the lipophilic starch, when dispersed in the aqueous phase of the emulsion concentrate, forms a film which encapsulates the fat globules in the emulsion concentrate to provide emulsion stability through drying, and which has a suitable hydrophobic-hydrophilic balance upon drying to provide a gradual or controlled release of the fat globules encapsulated by the starch.

Excellent results have been obtained using as the lipophilic starch, No. 7415 Lipophilic Starch, sold commercially by Anheuser-Busch, Inc. Other lipophilic starch derivatives may, of course, also be used.

In order to prepare a dried, protein-free, fat emulsion product which is stable through the drying step and which, when reconstituted, forms an oil-in-water emulsion which is stable in the presence of alcohol and an acidic pH, the amount of lipophilic starch derivative included in the liquid emulsion concentrate should to sufficient to encapsulate substantially all of the fat globules in the emulsion concentrate. Preferably the liquid emulsion concentrate is homogenized to provide an emulsion in which the fat or oil particles average about 1-3 microns in diameter. With fat particles of such size, the amount of lipophilic starch included in the emulsion concentrate should be about 50% to 85% by weight of the fat. If the fat particles are homogenized to a smaller average particle size, so that the surface of the fat is increased, greater amounts of the lipophilic starch must be used. Similarly, if the fat particles have a larger average particle size, lesser amounts of the lipophilic starch derivative may be used.

The liquid emulsion concentrate is prepared by dissolving and/or dispersing the components of the dried emulsion (i.e. carbohydrate, fat or oil, and lipophilic starch derivative) in sufficient water to maintain the solids in solution or dispersion and provide sufficient fluidity to the liquid concentrate so that it may be pumped. Generally, the dissolved and dispersed solids of the liquid emulsion concentrate are in the range of about 50%-70%. Typically, the lipophilic starch is added to hot (180° F.-200° F.) water and the resulting slurry maintained at such temperature for about 30 minutes. Thereafter, the hot starch slurry is added to hot water (180° F.-200° F.) and the carbohydrate, such as corn syrup solids, and fat (which has been heated to a temperature of about 150° F.—160° F. to liquify the fat) are added with mixing to the aqueous starch slurry. The resulting mix is then pasteurized and homogenized to form an oil-in-water emulsion in which the fat particles average about 1-3 microns in diameter. This liquid emulsion concentrate is then dried, such as by spray drying, drum drying, etc. to a moisture content of about 3% or below. If desired, one or more stabilizers, such as carrageenan, carboxymethyl cellulose, microcrystalline cellulose, and the like, including mixtures thereof, may be dry blended with the dried emulsion concentrate in amounts of from about 0.1% to 10% by weight of the dried emulsion concentrate, in order to increase the body and viscosity of the reconstituted emulsion product.

The dried, protein-free fat emulsion product thus obtained may be used for any of the uses of conventional dried fat emulsion products, such as coffee whiteners, sour cream mixes, dip mixes, and the like. However, the dried emulsion concentrate of this invention is particularly well suited for use in combination with a flavored wine base to produce a wine base beverage having a creamy appearance and creamy mouthfeel. Thus, the dried emulsion concentrate, with or without added stabilizers, is reconstituted with hot water to form an oil-in-water emulsion, containing about 15%-30% by wt. of the emulsion concentrate. The resulting emulsion is combined with wine and, optionally, other ingredients such as sugar, syrup, flavorings and color, to provide a wine based product having a desired creamy appearance and mouthfeel, the product having an alcohol content of about 8%-20% (vol/wt), and a pH of about 2.5-5.0. This product is then pasteurized and homogenized to form a unique wine base beverage which is shelf stable when packaged in an appropriate container, is resistant to separation and grain or sludge formation, and may be stored at room temperature or under refrigeration. The novel dried fat emulsion product of this invention provides a stable oil-in-water emulsion in the wine, despite the relatively high alcohol concentration of about 8%-20% (vol/wt), relatively high acidity (pH 2.5-5.0), and a variety of protein distabilizing compounds such as tannins, which are present in wine. These conditions cause instability of emulsions made from conventional protein-containing dried fat emulsion products, and have made the use of protein-free dried fat emulsion products, available prior to this invention, unsatisfactory. However, the dried emulsion concentrate of this invention, when reconstituted with water and added to wine, forms an oil-in-water emulsion which is stable in the presence of the alcohol concentration and acidity found in wine, with the emulsion retaining its stability through a wide range of temperatures, including pasteurizing and freezing temperatures. The amount of the dried fat emulsion concentrate which may be combined with the wine to provide the wine with a desired creamy appearance and mouthfeel may vary over a wide range. A stable oil-in-water emulsion in the wine may be obtained using a ratio of wine to dried emulsion product of about 5:1 to 15:1, with a ratio of between 8-12:1 being preferred.

The following examples are given to further illustrate, not to limit, the invention. In the instant specification, appended claims and the following examples, all parts and percentages are by weight unless otherwise indicated.

EXAMPLE I

The dried, protein-free fat emulsion concentrate of the present invention was prepared in the following manner. Fifteen parts by weight of a lipophilic starch (sold commercially by Anheuser-Busch, Inc. under the designation No. 7415 Lipophilic Starch) was added with mixing to 35 parts by weight of water which was at a temperature of about 190° F., and the resulting starch dispersion maintained at about 190° F., with stirring, for 30 minutes. Thirty-four parts by weight of water was introduced into a separate vessel and heated to about 190° F. To this hot water was then added the hot aqueous starch dispersion, 59 parts by weight of corn syrup solids, and 20 parts by wt. of hydrogenated coconut oil, having a melting point of 108° F.-112° F., which had been heated to 160° F. to liquify the fat. The resulting dispersion was pasteurized by heating to 155° F. for 20 minutes, and was then homogenized in a two-stage homogenizer at 2500 psi and 500 psi. The emulsion concentrate thus formed was then spray dried to provide a dried, protein-free, fat emulsion product having a moisture content of less than 3%, in which the fat globules had an average particle size of less then 3 microns in diameter, with the fat globules being encapsulated by the lipophilic starch.

EXAMPLE II

A wine base beverage having a creamy appearance and mouthfeel is prepared using the dried fat emulsion product produced by Example I, in the following manner. About 5 parts by weight of a stabilizer mixture containing microcrystalline cellulose and carrageenan is blended with 60 parts by weight of the dried fat emulsion concentrate of Example I, and this dry blend is mixed with about 180 parts by weight of hot (180° F.) water to form an oil-in-water emulsion. To this emulsion is added about 560 parts by weight of fortified wine (having an alcohol content of 22.5%) and about 170 parts by weight of corn syrup. The resulting mixture is heated to about 140° F. and is homogenized in two stages at 2500 psi and 500 psi. The resulting emulsion is filled into suitable containers which are then sealed. The product thus produced is a wine based beverage having an alcohol content of about 12%-14% (vol/wt) and a pH in the range of 3.5 to 4.5, with the beverage having a creamy appearance and mouthfeel imparted thereto by the oil-in-water emulsion. The product is shelf stable and exhibits no grain or sludge formation or phase separation after extended periods of storage.

Although the present invention has been described with reference to specific examples, it will be understood that changes, modifications, and variations of composition and procedure may be made by those skilled in the art within the principle and scope of the appended claims.

What is claimed is:

1. A dried, protein-free fat emulsion product which upon reconstitution with an aqueous medium forms an oil-in-water emulsion which is stable in the presence of an alcohol concentration of over 8% (vol/wt) with a pH in the range of 2.5-5.0, said dried emulsion product comprising from about 57% to 65% by weight of a water soluble carbohydrate, and from 15% to 25% by weight of an edible fat or oil having an average particle size of about 1-3 microns in diameter, with said fat particles being encapsulated by a lipophilic starch derivative, the amount of said lipophilic starch derivative in the dried emulsion product being about 50% to 85% by weight of the fat or oil.

2. The dried emulsion product defined in claim 1 in which the lipophilic starch is water dispersible and forms films with the proper hydrophobic-hydrophilic balance to provide a gradual release of the encapsulated fat or oil particles when dispersed in water.

3. The dried emulsion product defined in claim 1 in which the product contains about 0.1% to 10% by weight of a bodying and viscosity-increasing agent.

4. The dried emulsion product defined in claim 3 in which the agent is selected from the group consisting of carrageenan, carboxymethyl cellulose, microcrystalline cellulose, and mixtures thereof.

5. A method of preparing a stable oil-in-water emulsion in a liquid having a relatively high alcohol concentration and high acidity which comprises
adding a dried protein-free fat emulsion concentrate consisting essentially of a water soluble carbohydrate and particles of an edible fat or oil which are encapsulated within a lipophilic starch derivative, to an amount of water sufficient to form an aqueous oil-in-water emulsion containing about 15% to 30% by wt. of the emulsion concentrate, and
combining the emulsion thus formed with a liquid having an alcohol concentration of about 8% to 20%, vol/wt, and a pH of about 2.5 to 5.0 to form in said liquid a stable oil-in-water emulsion which imparts a creamy appearance and mouthfeel to said liquid.

6. The method defined in claim 5 in which said liquid is wine.

7. The method defined in claim 6 in which the amount of said aqueous emulsion combined with the wine is sufficient to provide a ratio of wine to dried fat emulsion concentrate of 5:1 to 15:1.

8. The method defined in claim 6 in which said dried fat emulsion concentrate consists essentially of a major proportion by weight of a water soluble carbohydrate, and from about 15% to 25% by weight of an edible fat or oil having an average particle size of about 1-3 microns in diameter the amount of said starch derivative in the dried emulsion concentrate being about 50% to 85% by weight of the fat or oil.

9. The method defined in claim 6 in which the dried emulsion concentrate contains about 0.1% to 10% by wt of a stabilizer selected from the group consisting of carrageenan, carboxymethyl cellulose, microcrystalline cellulose, and mixtures thereof.

10. The method defined in claim 6 in which the wine containing the oil-in-water emulsion is pasteurized, homogenized and filled into containers.

* * * * *